F. A. BOWER.
AXLE AND METHOD OF FORMING THE SAME.
APPLICATION FILED OCT. 26, 1914.
1,164,915.
Patented Dec. 21, 1915.
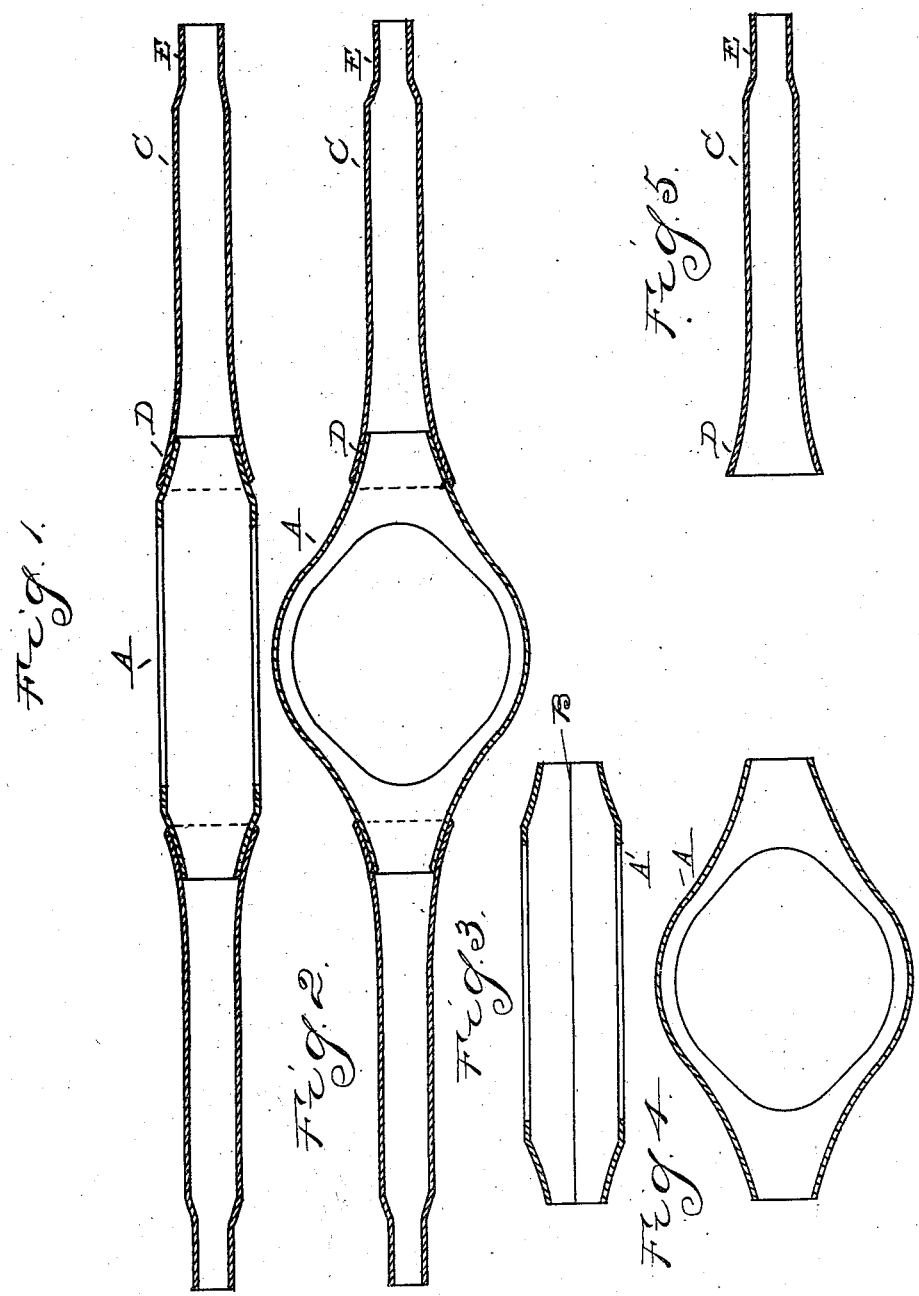
WITNESSES:
INVENTOR
Ferdinand A. Bower
BY
Whittemore Hulbert & Whittemore
ATTORNEYS

UNITED STATES PATENT OFFICE.

FERDINAND A. BOWER, OF FLINT, MICHIGAN, ASSIGNOR TO GENERAL MOTORS COMPANY, OF DETROIT, MICHIGAN, A CORPORATION OF NEW JERSEY.

AXLE AND METHOD OF FORMING THE SAME.

1,164,915.  Specification of Letters Patent.  Patented Dec. 21, 1915.

Application filed October 26, 1914. Serial No. 868,667.

*To all whom it may concern:*

Be it known that I, FERDINAND A. BOWER, a citizen of the United States of America, residing at Flint, in the county of Genesee and State of Michigan, have invented certain new and useful Improvements in Axles and Methods of Forming the Same, of which the following is a specification, reference being had therein to the accompanying drawings.

The invention relates to axles designed for use in connection with motor vehicles, and it is the object of the invention to simplify the construction and cheapen the method of manufacture.

In the present state of the art a common type of axle housing is one which is formed from two complementary sheet metal stampings which are welded or otherwise secured to each other. An objection to this construction is that as the gage of the metal is uniform it is necessary either to make some parts of greater thickness than required or to reinforce other parts. With the present construction this difficulty is avoided by forming the central part only from stampings, while the opposite end portions are formed from tubes flared at their inner ends for joining the stamping.

In the drawings: Figures 1 and 2 are longitudinal sections through my improved axle, the planes of section being at right angles to each other; Figs. 3 and 4 are similar views of the stampings forming the central portion of the axle; and Fig. 5 is a view of the tubular portion which is joined to said stampings.

A is the central portion of the axle formed of complementary stampings joined to each other by welding or any other suitable way. As shown in Fig. 3, the joint is in the central horizontal plane B of the axle, but this is not necessary and the sections may be joined in any plane.

C are the end portions of the axle, which are formed from tubing, the inner ends being flared as indicated at D and the outer ends being preferably contracted as at E. The flared portions D are fashioned to fit the ends of the stampings A with an overlapping joint which is welded or otherwise secured. The overlap forms a reinforcement for the axle at a point where additional strength is required and does away with the necessity of any other strengthening means.

An axle housing formed as described is less expensive to manufacture than where formed entirely of stampings and also possesses greater strength.

What I claim as my invention is:

1. An axle housing comprising a central portion adapted to receive the differential gearing formed of stamped metal having tapering ends, and end portions for housing the greater portion of the length of the axle shafts formed from tubing slightly flared to fit said tapering ends with an overlapping joint.

2. An axle housing comprising a central portion adapted to receive the differential gearing formed of complementary sheet metal stampings having their edges joined to each other, and end portions formed from seamless tubing overlapping and secured to said stampings for housing the greater portion of the length of the axle shafts, the overlapping portions of the end portions being of slightly greater diameter than the remaining portions.

3. An axle housing comprising a central portion adapted to receive the differential gearing formed of complementary sheet metal stampings having their edges joined together and provided with tapering end portions, and end sections formed from seamless tubing slightly flared to fit said tapering end portions and secured thereto, said end sections forming the housing for the greater part of the length of the axle shafts.

4. An axle housing, comprising a central enlarged portion formed of complementary sheet metal stampings having their edges joined and provided with tapering end portions, said enlarged portion forming a housing for the differential gearing, and tubular end sections for housing the axle shafts slightly flared to fit over said tapering portions and welded thereto.

In testimony whereof I affix my signature in presence of two witnesses.

FERDINAND A. BOWER.

Witnesses:
 GUY W. PHELPS,
 A. C. ANDERSON.